(12) United States Patent
Uchida

(10) Patent No.: US 8,976,274 B2
(45) Date of Patent: Mar. 10, 2015

(54) APPARATUS AND METHOD FOR IMAGE PICKUP AND CORRECTION

(71) Applicant: Canon Kabushiki Kaisha, Tokyo (JP)

(72) Inventor: Mineo Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 13/646,970

(22) Filed: Oct. 8, 2012

(65) Prior Publication Data

US 2013/0093912 A1 Apr. 18, 2013

(30) Foreign Application Priority Data

Oct. 12, 2011 (WO) .................. PCT/JP2011/073387

(51) Int. Cl.
*H04N 9/64* (2006.01)
*H04N 5/235* (2006.01)
*H04N 5/232* (2006.01)
*H04N 5/365* (2011.01)
*H04N 5/361* (2011.01)

(52) U.S. Cl.
CPC ........... *H04N 5/23232* (2013.01); *H04N 5/365* (2013.01); *H04N 5/2355* (2013.01); *H04N 5/361* (2013.01)
USPC ....................................... 348/243; 348/229.1

(58) Field of Classification Search
CPC .............. H04N 5/2355; H04N 5/2356; H04N 5/23232; H04N 5/35572; H04N 5/361; H04N 5/365; H04N 5/3655; G06T 5/50
USPC ............................. 348/243, 229.1, 230.1, 362
See application file for complete search history.

(56) References Cited

U.S. PATENT DOCUMENTS

| | | | | |
|---|---|---|---|---|
| 6,563,536 | B1 * | 5/2003 | Rashkovskiy et al. | 348/243 |
| 6,710,807 | B1 * | 3/2004 | Yamagishi | 348/362 |
| 6,710,808 | B1 * | 3/2004 | Yamagishi | 348/362 |
| 6,747,696 | B1 * | 6/2004 | Nakata et al. | 348/243 |
| 6,956,978 | B2 * | 10/2005 | Staudacher et al. | 382/274 |
| 6,965,410 | B1 * | 11/2005 | Yamagishi | 348/362 |
| 6,982,757 | B2 * | 1/2006 | Tariki | 348/243 |
| 7,023,479 | B2 * | 4/2006 | Hiramatsu et al. | 348/243 |

(Continued)

FOREIGN PATENT DOCUMENTS

JP 62-285583 A 12/1987
JP 2002135661 A * 5/2002

(Continued)

*Primary Examiner* — John Villecco
(74) *Attorney, Agent, or Firm* — Canon USA Inc IP Division

(57) ABSTRACT

An image pickup apparatus and method which reduces fixed pattern noise appearing in multiple exposure shooting and which can obtain a high-quality multiple exposure image. Multiple pieces of exposure image data are obtained by exposing an image pickup device. The multiple pieces of exposure image data are subjected to image processing. The multiple pieces of image processed exposure image data are synthesized to generate synthesized exposure image data. Multiple pieces of dark image data are obtained by shielding the image pickup device from light. Each of the multiple pieces of dark image data is subjected to image processing equivalent to image processing performed on a corresponding one of the multiple pieces of exposure image data. The multiple pieces of image processed dark image data that are synthesized to generate synthesized dark image data. The synthesized exposure image data is corrected on the basis of the synthesized dark image data.

11 Claims, 14 Drawing Sheets

(56) References Cited

U.S. PATENT DOCUMENTS

| | | | |
|---|---|---|---|
| 7,136,100 B1 * | 11/2006 | Kato et al. | 348/241 |
| 7,339,620 B1 * | 3/2008 | Yamagishi et al. | 348/243 |
| 7,554,585 B2 * | 6/2009 | Masuyama | 348/243 |
| 7,782,377 B2 * | 8/2010 | Miyanari et al. | 348/241 |
| 7,782,379 B2 * | 8/2010 | Sato | 348/243 |
| 7,804,533 B2 * | 9/2010 | Oshima | 348/246 |
| 7,856,174 B2 * | 12/2010 | Tanaka et al. | 396/55 |
| 7,948,531 B2 * | 5/2011 | Tanizoe et al. | 348/241 |
| 8,040,403 B2 * | 10/2011 | Sakamoto et al. | 348/243 |
| 8,081,220 B2 * | 12/2011 | Kawai | 348/208.12 |
| 8,090,181 B2 * | 1/2012 | Omi | 382/132 |
| 8,237,812 B2 * | 8/2012 | Kita et al. | 348/229.1 |
| 2002/0015111 A1 * | 2/2002 | Harada | 348/642 |
| 2003/0179302 A1 * | 9/2003 | Harada et al. | 348/231.6 |
| 2004/0032490 A1 * | 2/2004 | Uchida | 348/96 |
| 2004/0165101 A1 * | 8/2004 | Miyanari et al. | 348/363 |
| 2005/0231615 A1 * | 10/2005 | Kitani | 348/241 |
| 2005/0253934 A1 * | 11/2005 | Yamagishi et al. | 348/222.1 |
| 2005/0253935 A1 * | 11/2005 | Hiramatsu et al. | 348/222.1 |
| 2006/0092297 A1 * | 5/2006 | Lee et al. | 348/241 |
| 2007/0146508 A1 * | 6/2007 | Oshima | 348/243 |
| 2008/0074514 A1 * | 3/2008 | Harada et al. | 348/243 |
| 2013/0016252 A1 * | 1/2013 | Yoshida | 348/239 |
| 2013/0093909 A1 * | 4/2013 | Uchida | 348/221.1 |

FOREIGN PATENT DOCUMENTS

| | | | |
|---|---|---|---|
| JP | 2003-333434 A | | 11/2003 |
| JP | 2004-207895 A | | 7/2004 |
| JP | 2005159447 A | * | 6/2005 |
| JP | 2005-191641 A | | 7/2005 |
| JP | 2006109162 A | * | 4/2006 |
| JP | 2006-345458 A | | 12/2006 |
| JP | 2008-092548 A | | 4/2008 |
| JP | 2008252714 A | * | 10/2008 |
| JP | 2010-141583 A | | 6/2010 |
| WO | 2008/153085 A1 | | 12/2008 |

* cited by examiner

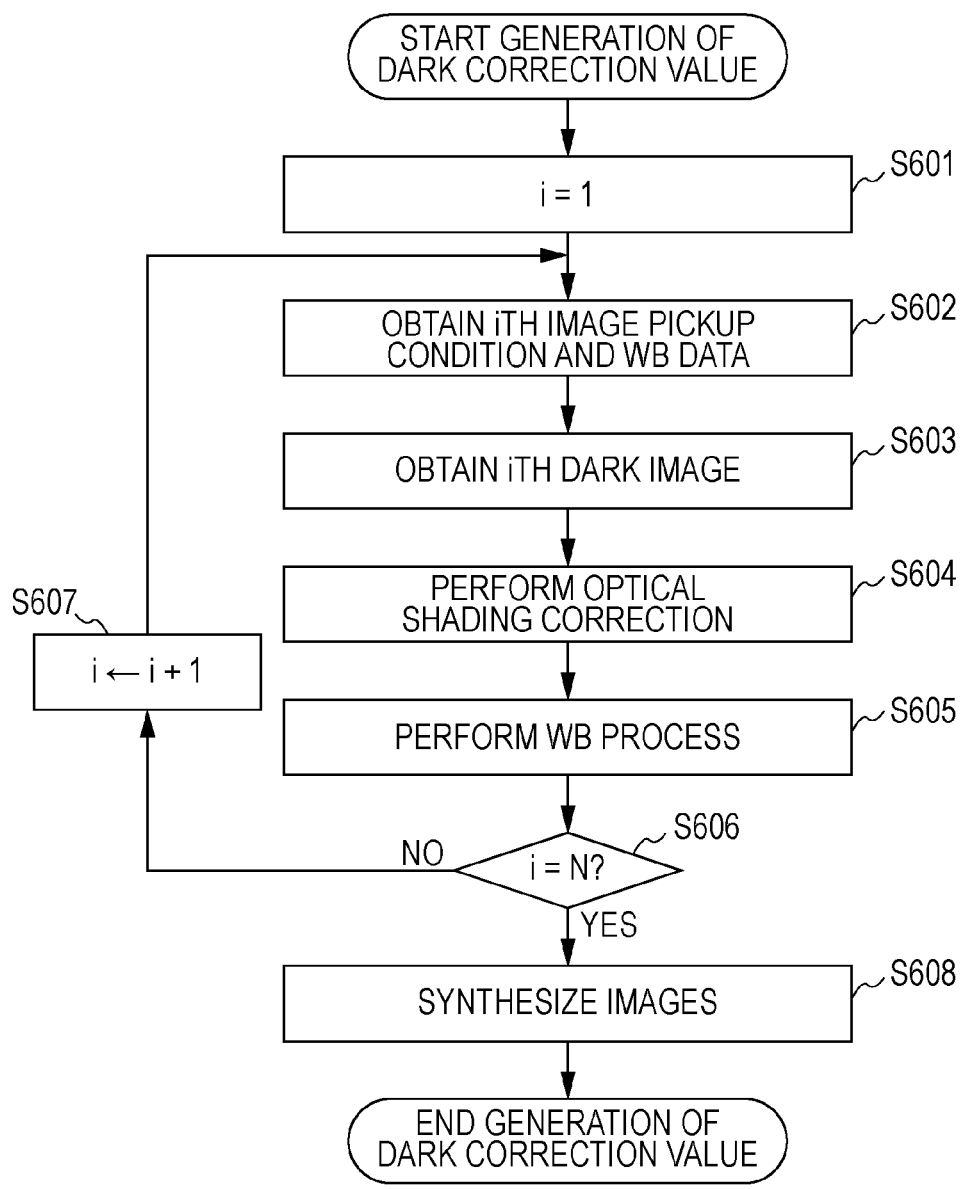

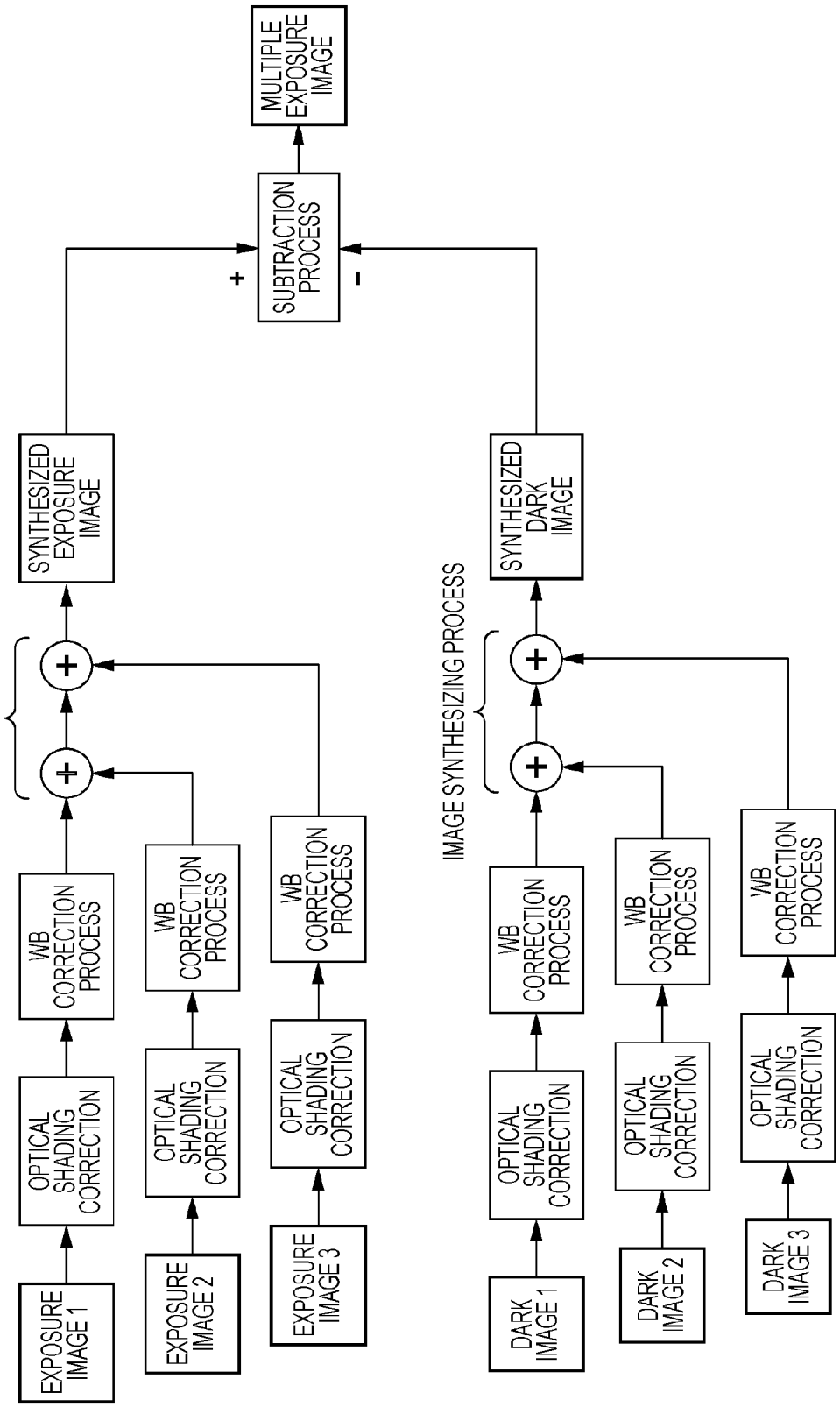

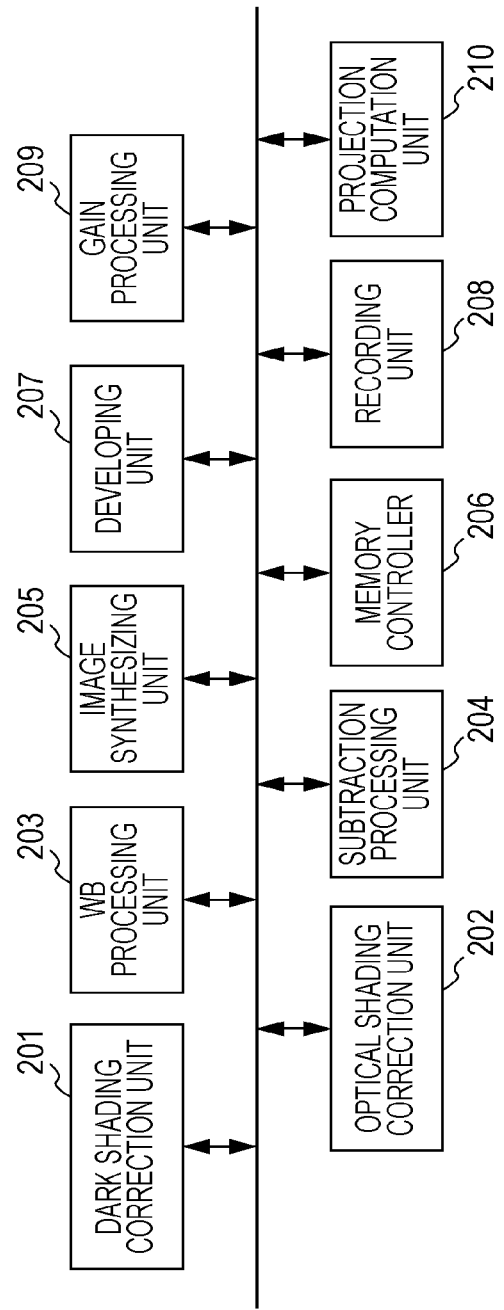

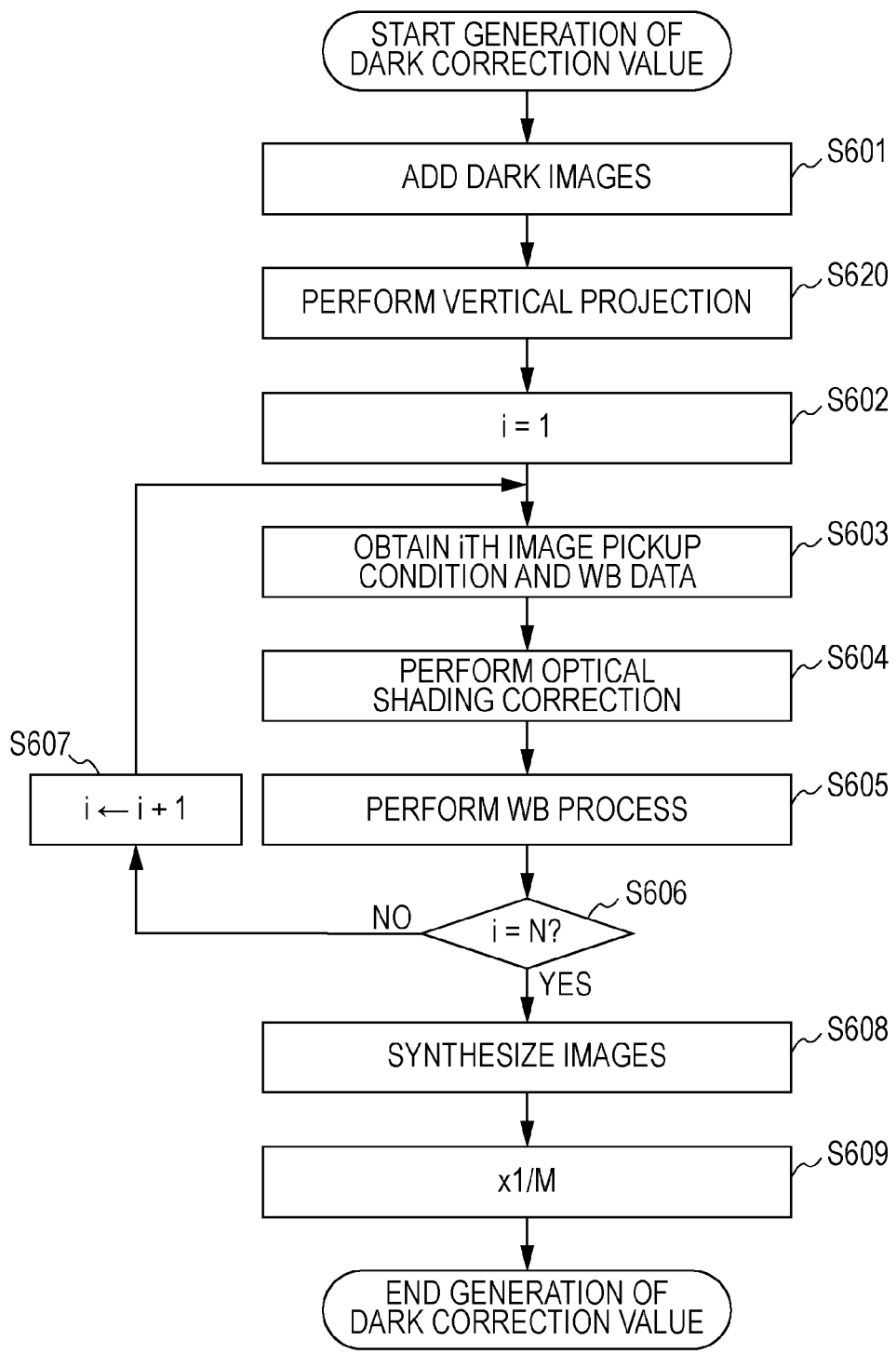

APPARATUS AND METHOD FOR IMAGE PICKUP AND CORRECTION

TECHNICAL FIELD

The present invention relates to an image pickup apparatus which can pick up a multiple exposure image, and a method for controlling the image pickup apparatus.

BACKGROUND ART

In an image pickup apparatus employing an image pickup device such as a CMOS image sensor, fixed pattern noise occurs which is caused by a readout circuit in the image pickup device. One commonly known method for reducing such fixed pattern noise so as to obtain a high-quality image is a method in which fixed pattern noise is corrected by subtracting prestored data from image data. For example, in PTL 1, a method is disclosed in which fixed pattern noise in an image may be corrected by using prestored one-dimensional data in accordance with the image pickup conditions.

CITATION LIST

Patent Literature

PTL 1: Japanese Patent Laid-Open No. 2003-333434

However, in PTL 1, no reference is particularly made to, for example, a method for correcting fixed pattern noise that is inherent in multiple exposure shooting in which the above-described image pickup apparatus employing an image pickup device is used to pick up multiple images and generate a synthesized image through addition of the multiple images.

Therefore, it is an object of an example of the present invention to provide an image pickup apparatus which can reduce noise in multiple exposure shooting and obtain a high-quality multiple exposure image.

SUMMARY OF INVENTION

To achieve the above-described object, an example of the present invention provides an image pickup apparatus including an image pickup, an image processor, a synthesizer, and a corrector. The image pickup picks up a subject image and outputs image data. The image processor subjects the image data that is output from the image pickup to image processing. The synthesizer synthesizes multiple pieces of image data. The image pickup apparatus further includes a controller which performs control as follows. The image pickup obtains multiple pieces of exposure image data by exposing an image pickup device thereof to light to pick up images. The image processor subjects the multiple pieces of exposure image data to image processing. The synthesizer synthesizes the multiple pieces of exposure image data that are output from the image processor, to generate synthesized exposure image data.

The image pickup obtains multiple pieces of dark image data by shielding the image pickup device from light to pick up images.

The image processor subjects each of the multiple pieces of dark image data to image processing equivalent to image processing performed on a corresponding one of the multiple pieces of exposure image data.

The synthesizer synthesizes the multiple pieces of dark image data that are output from the image processor, to generate synthesized dark image data. The corrector corrects the synthesized exposure image data on the basis of the synthesized dark image data.

An example of the present invention also provides a method for controlling an image pickup apparatus. The image pickup picks up a subject image and outputs image data. The image processor subjects the image data that is output from the image pickup to image processing. The synthesizer synthesizes multiple pieces of image data through addition. The method includes a first image pickup step, a first image processing step, a first synthesizing step, a second image pickup step, a second image processing step, a second synthesizing step, and a correction step. In the first image pickup step, multiple pieces of exposure image data are obtained by exposing an image pickup device thereof to light to pick up images. In the first image processing step, the multiple pieces of exposure image data are subject to image processing, and multiple pieces of processed exposure image data are output. In the first synthesizing step, the multiple pieces of exposure image data that are output from the first image processing step are synthesized to generate synthesized exposure image data. In the second image pickup step, multiple pieces of dark image data are obtained by shielding the image pickup device from light to pick up images. In the second image processing step, each of the multiple pieces of dark image data is subject to image processing equivalent to image processing performed in the first image processing step on a corresponding one of the multiple pieces of exposure image data. In the second synthesizing step, the multiple pieces of the processed dark image are synthesized to generate synthesized dark image data. In the correction step, the synthesized exposure image data is corrected on the basis of the synthesized dark image data.

Further features of the present invention will become apparent from the following description of exemplary embodiments with reference to the attached drawings.

BRIEF DESCRIPTION OF DRAWINGS

FIG. 6A is a flowchart of image processing according to the first embodiment.

FIG. 6B is a flow diagram of image processing according to the first embodiment.

FIG. 7 is a block diagram illustrating a DSP according to a second embodiment.

FIG. 10A is a flowchart of image processing according to a fourth embodiment.

DESCRIPTION OF EMBODIMENTS

First Embodiment

The present embodiment is characterized by performing a process for reducing noise caused by multiple exposure shooting in pickup of a multiple exposure image. When a multiple exposure image is picked up by adding and synthesizing multiple images, a correction error of fixed pattern noise (such as a vertical streak, a horizontal streak, a defect, and dark shading) may be superimposed multiple times, as the number of added images increase it may become apparent. For example, when correction errors caused by one-dimensional data in the horizontal direction as in PTL 1 are superimposed, such errors become apparent as dark shading having horizontal directional components or a vertical streak in an image.

Accordingly, according to the present embodiment, in addition to exposure images obtained in the main image pickup operation in multiple exposure shooting, dark images are obtained by picking up images in a light-shielded state, and the dark images are synthesized after being subjected to image processing equivalent to that for the exposure images, thereby generating a synthesized dark image. The synthesized dark image data is subtracted from synthesized exposure image data obtained by synthesizing the exposure images, whereby multiple exposure image data having reduced noise is obtained.

Figure 2:
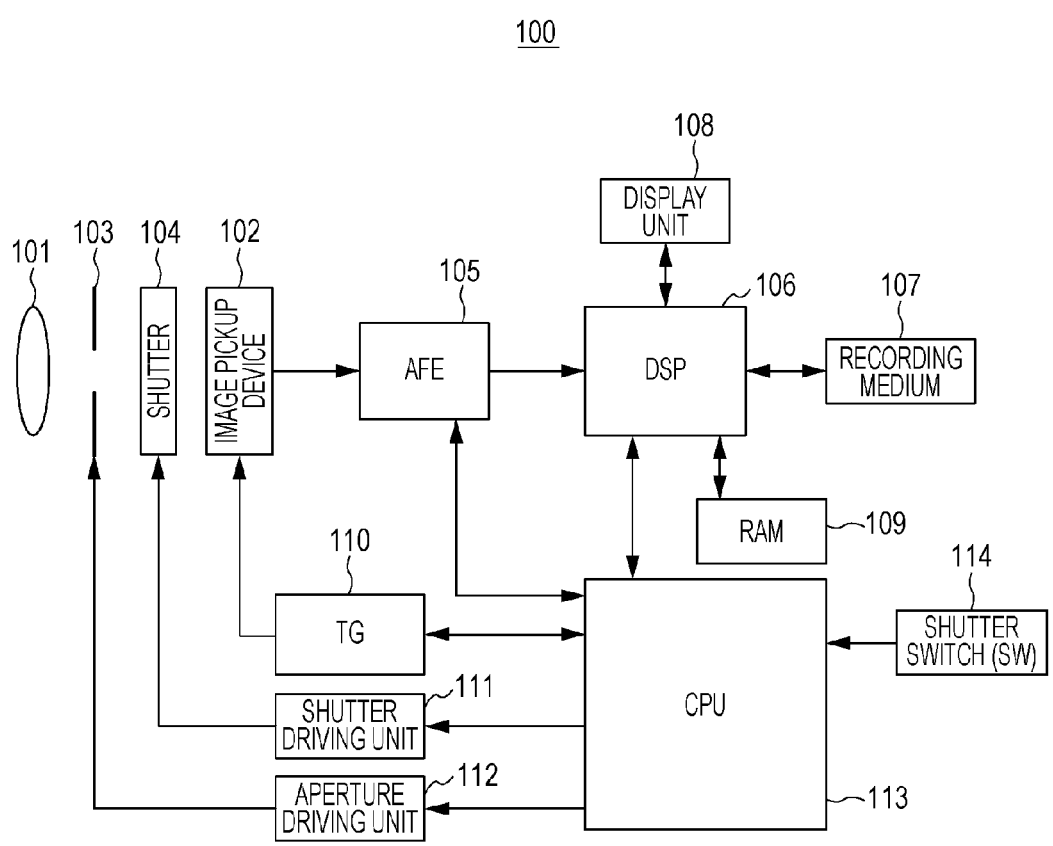
FIG. 2 is a diagram illustrating an overall configuration of an image pickup apparatus according to an embodiment of the present invention.

Hereinafter, preferable embodiments of the present invention will be described in detail on the basis of the accompanying drawings. FIG. 2 is a diagram illustrating an overall configuration of an image pickup apparatus 100 according to an embodiment of the present invention.

A subject image formed by light from a subject through an image pickup lens 101 is picked up and subjected to photoelectric conversion by an image pickup device 102. According to the present embodiment, a CMOS image sensor employing a Bayer array is used as the image pickup device 102. However, the image pickup device 102 is not limited to this, and, for example, a CMOS sensor employing another type of array, or a CCD image sensor may be used. An aperture 103 and a mechanical shutter 104 are provided between the image pickup lens 101 and the image pickup device 102 in an image pickup optical path, and adjust the amount of light emitted to the image pickup device 102.

Analog image signals which are output from the image pickup device 102 are converted into digital signals by an AFE (Analog Front End) 105. A DSP (Digital Signal Processor) 106 performs various types of image processing on the digital image signals which are output from the AFE 105.

A recording medium 107 records image data. A display unit 108 displays picked-up images and various menu screens, and, for example, a liquid crystal display (LCD) is used.

A RAM 109 is connected to the DSP 106, and temporarily stores, for example, image data.

A TG (Timing Generator) 110 supplies the image pickup device 102 with driving signals. A shutter driving unit 111 drives the mechanical shutter 104. An aperture driving unit 112 drives the aperture 103.

A CPU 113 controls the AFE 105, the DSP 106, the TG 110, the shutter driving unit 111, the aperture driving unit 112, and other units.

A shutter switch (SW) 114 transmits an instruction to pick up an image to the CPU 113 in accordance with an operation of a photographer.

Figure 3:
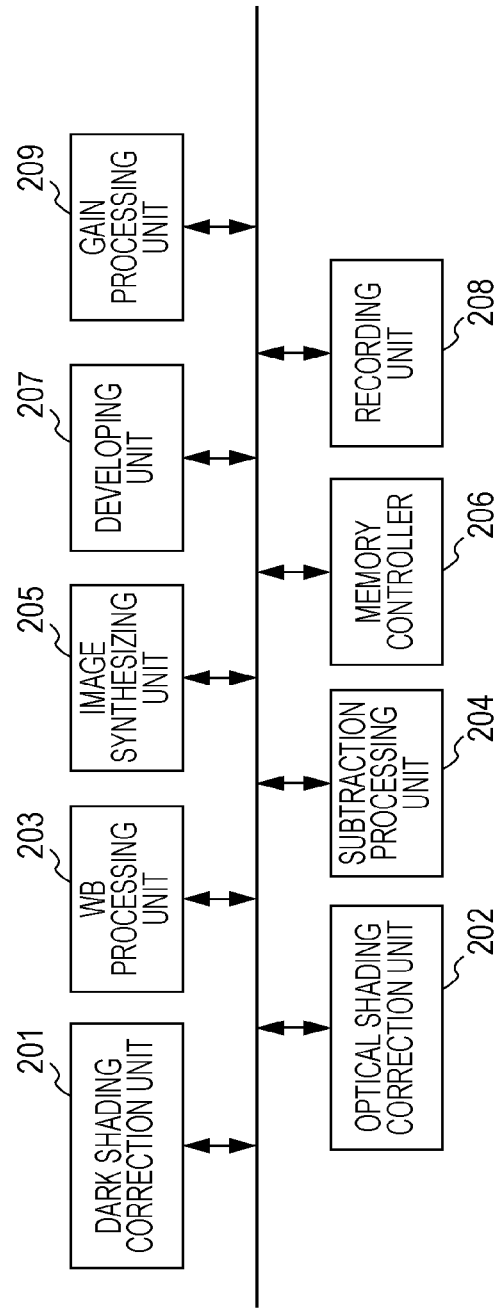
FIG. 3 is a block diagram illustrating a DSP according to a first embodiment.

FIG. 3 is a diagram illustrating a block configuration of the inside of the DSP 106. A dark shading correction unit 201 corrects dark shading in the horizontal direction by subtracting a correction value, which is one-dimensional data in the horizontal direction, from an image. An optical shading correction unit 202 corrects optical shading by performing gain correction in accordance with the positions (coordinates) in the horizontal or vertical direction on an image. A WB (white balance) processing unit 203 performs a white balance process by multiplying each of pixels of R, G1, G2, and B in the Bayer array by a gain. A subtraction processing unit 204 subtracts the dark image from the exposure image as described below.

An image synthesizing unit 205 performs image synthesizing computation in multiple exposure shooting. According to the present embodiment, a multiple exposure image is generated by adding and synthesizing the predetermined number of images. A memory controller 206 controls reading and writing of image data or correction values used in correction blocks to the RAM 109. A developing unit 207 performs developing processes, such as a color matrix process and a gamma process, on the image data. A recording unit 208 writes the image data obtained after the developing processes into the recording medium 107.

A gain processing unit 209 can multiply the image data by any gain.

Figure 1:
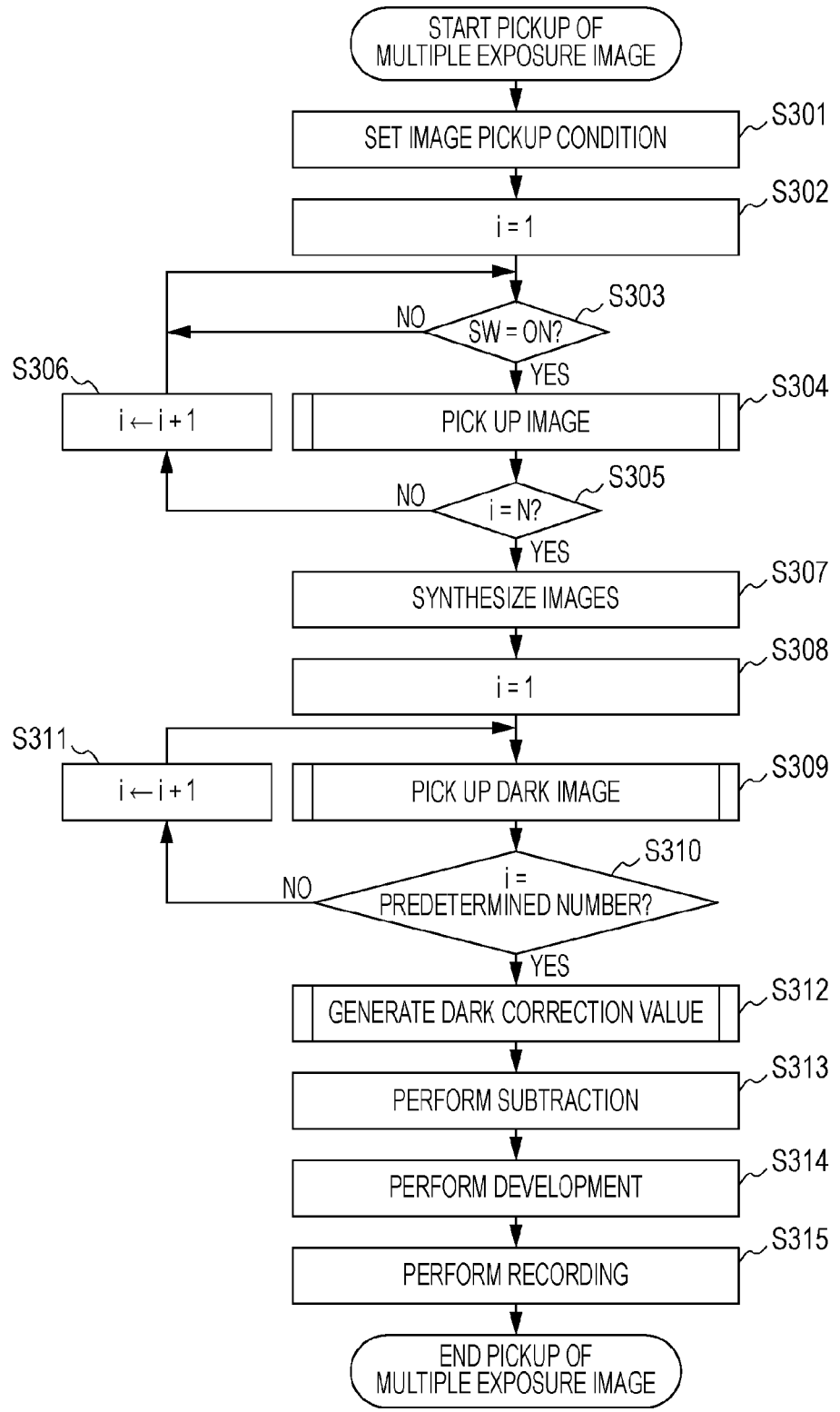
FIG. 1 is a flowchart of operations in pickup of a multiple exposure image according to an embodiment of the present invention.

FIG. 1 is a flowchart of a series of camera operations in pickup of a multiple exposure image.

In step S301, various image pickup conditions, such as the number of images to be picked up in multiple exposure shooting, the WB, the AE, and the ISO sensitivity, are set through operations by a photographer. The number of images to be picked up may be automatically set depending on scene determination or a mode. Assume that the number of images to be picked up is set to N. In subsequent step S302, a variable i which manages the number of images picked up in multiple exposure shooting is cleared, and is set to '1'. In step S303, the process waits until the shutter switch 114 (SW) is turned on by an operation which is performed by a photographer and which indicates an instruction to pick up an image. If the shutter switch 114 (SW) is turned on, an image pickup operation is performed in step S304, and one image is picked up. The image pickup operation will be described in detail below. After that, in step S305, it is determined whether or not the image pickup operation is for the last (Nth) image in the multiple exposure shooting. If the variable i is less than N, the number of picked-up images does not reach N. Accordingly, in step S306, the variable i is incremented, and the process then returns back to step S303 and waits until the next instruction to pick up an image (steps S304 to S306: first image pickup step). In step S305, if the number of picked-up images reaches N, the process proceeds to step S307, and the image synthesizing unit 205 performs an image synthesizing process in which the N picked-up images are added (first synthesizing step).

After the image synthesizing process is completed, in step S308, the variable i is again cleared for a dark image pickup operation, and is set to '1'. Subsequently, in step S309, the dark image pickup operation is performed. The dark image pickup operation will be described in detail below. According to the present embodiment, the predetermined number of dark images in the dark image pickup operation is N which is the same as the number of exposure images to be picked up. In step S310, the value of the variable i is checked. If the value is less than N, which is the number of images for the multiple exposure shooting, in step S311, the variable i is incremented, and the process returns back to step S309 and is repeated until the number of picked-up dark images reaches N (steps S309 to S311: second image pickup step). If the dark image pickup operation is repeatedly performed N times, in step S312, a dark correction value is generated by using the N dark images. The generation of a dark correction value will be described in detail below. In step S313, the subtraction processing unit 204 performs offset correction by subtracting the dark correction value generated in step S312 from the image generated in step S307. This correction reduces fixed pattern noise.

The image data obtained after the subtraction is subjected to developing processes, such as a color matrix process and a gamma process, by the developing unit 207 in step S314, and is then stored in the recording medium 107 by the recording unit 208 in step S315, and the pickup of a multiple exposure image ends.

Figure 4:
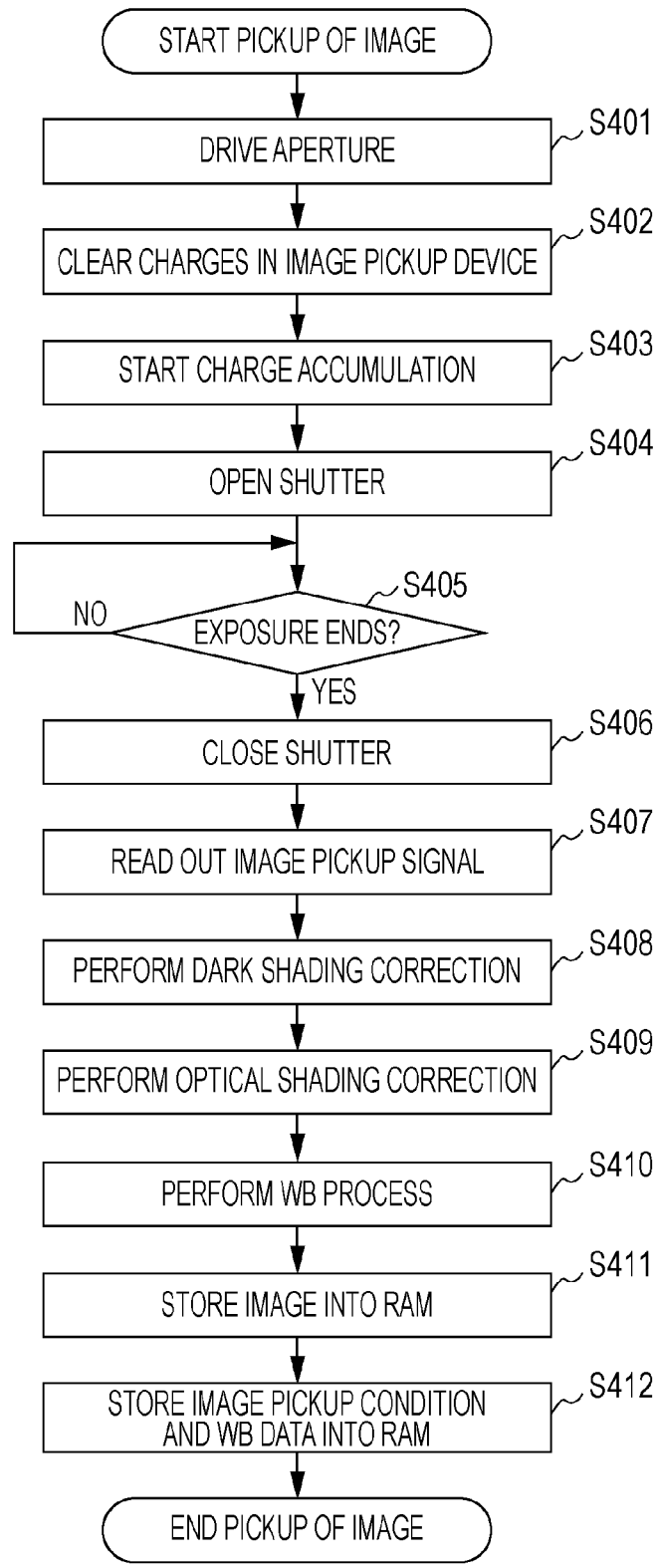
FIG. 4 is a flowchart of operations of picking up an image according to an embodiment of the present invention.

The image pickup operation in step S304 will be described in detail by using the flowchart illustrated in FIG. 4.

When the image pickup operation starts, the aperture is driven in step S401. In the driving of the aperture, the CPU 113 drives the aperture 103 by using the aperture driving unit 112. Then, in step S402, charges in the image pickup device 102 are cleared. This operation is caused by the CPU 113 which instructs the TG 110 to drive the image pickup device 102. When the charges are cleared, the image pickup device 102 enters a charge accumulation state (in step S403).

With the image pickup device 102 being in the charge accumulation state, in step S404, the CPU 113 opens the mechanical shutter 104 by using the shutter driving unit 111, and starts exposure of the image pickup device 102. The CPU 113 waits until a predetermined time period elapses in step S405, and then closes the mechanical shutter 104 by using the shutter driving unit 111, and ends the exposure of the image pickup device 102.

After that, image pickup signals are read out from the image pickup device 102 by driving the TG 110 in step S407. In step S408, the read-out image pickup signals are subjected to dark shading correction by the dark shading correction unit 201. The dark shading correction is performed in the horizontal direction by subtracting, from the image pickup signals, one-dimensional data in the horizontal direction which is obtained in advance by performing a projection operation on a dark image. Subsequently, in step S409, the optical shading correction unit 202 performs gain correction on the pixel signals in accordance with the coordinates positions, whereby the optical shading is corrected. At that time, the correction parameters are set to values according to the image pickup conditions used when the image to be corrected is picked up. The image pickup conditions here indicate, for example, a lens zoom position, the type of the image pickup lens, an aperture, a shutter speed, the ISO sensitivity, and a temperature.

In step S410, the image data obtained after the optical shading correction is subjected to a WB process in which each of R, G1, G2, and B pixels of the Bayer array is multiplied by a gain. The amount of gain here is a value calculated from the image data of an image to be processed, or a predetermined value (steps S409 to S410: first image processing step).

The image data obtained after the WB process is stored into the RAM 109 by using the memory controller 206 in step S411. In step S412, the memory controller 206 is also used to store the image pickup conditions and the WB data (the amount of gain) described above into RAM 109, and the image pickup operation ends.

Figure 5:
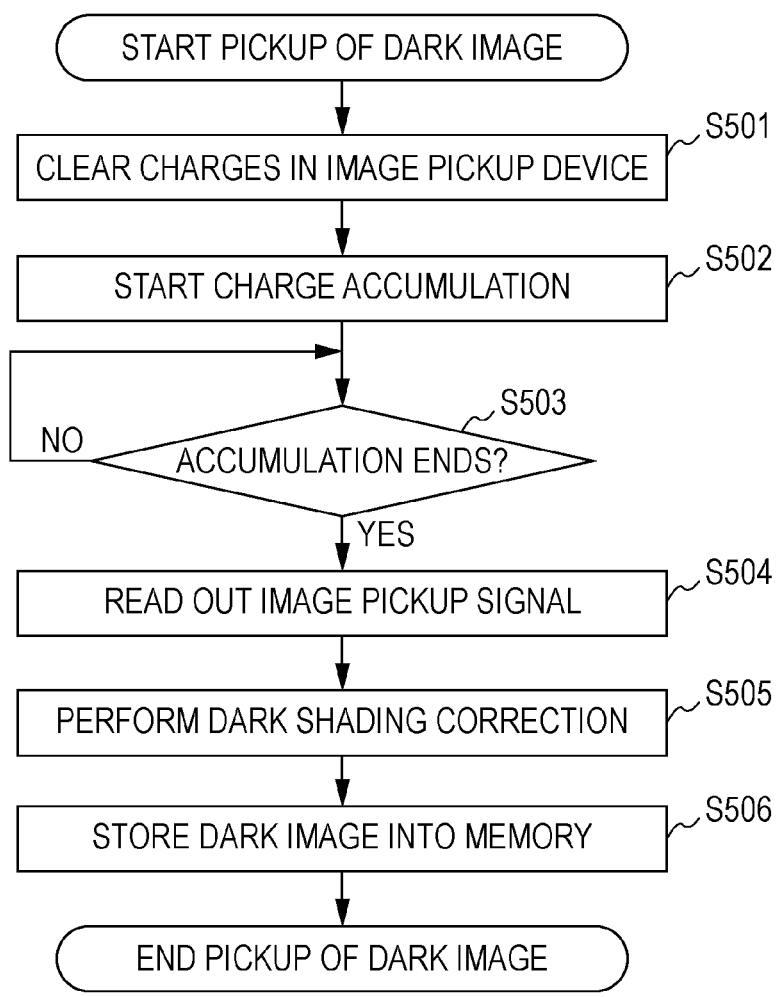
FIG. 5 is a flowchart of operations of picking up a dark image according to an embodiment of the present invention.

The dark image pickup operation will be described in detail by using the flowchart illustrated in FIG. 5. In the dark image pickup operation, the mechanical shutter 104 is not driven, and images are picked up in a state in which the image pickup device 102 is shielded from light.

In step S501, charges in the image pickup device 102 are cleared as in step S402 described above, and the image pickup device 102 enters the charge accumulation state (in step S502).

Then, after the process waits until a predetermined time period for accumulation elapses (in step S503), image pickup signals in the image pickup device 102 are read out in step S504. The read-out image pickup signals are subjected to the dark shading correction as in the step S408. The image data obtained after the correction is stored into the RAM 109 in step S506, and the dark image pickup operation ends.

The dark image pickup operation is repeatedly performed predetermined (N) times so that dark images, the number of which is the same as that of the exposure images in the main image pickup operation, are picked up. Then, a dark correction value is generated in step S312. The generation of a dark correction value will be described in detail by using the flowchart in FIG. 6A.

In step S601, the variable i is cleared to count processed dark images, and is set to '1'.

In step S602, the image pickup conditions and the WB data for the ith exposure image which has been picked up in step S304 are obtained from the RAM 109. These pieces of data have been stored into the RAM 109 in step S412. In step S603, the data of the ith dark image picked up in step S309 is obtained from the RAM 109 by using the memory controller 206. In step S604, the ith dark image thus obtained is subjected to an optical shading correction process. The correction parameters used at that time are set to parameters based on the image pickup conditions which are read out in step S602. According to the present embodiment, the same correction parameters as those for the ith image picked up in step S304 are used, but the correction parameters are not limited to these and modifications may be made as appropriate. However, it is preferable that the correction parameters be close to those for the ith image picked up in step S304. After the optical shading correction process ends, a WB process is performed in step S605 (steps S602 to S605: second image processing step). In this case also, the amount of gain (WB data) by which the pixels in the Bayer array are multiplied is set to the amount of gain based on the image pickup conditions which have been read out in step S602. According to the present embodiment, the gain is set to the same gain as that for the ith image picked up in step S304. However, the gain is not limited to this and modifications may be made as appropriate. In step S606, the value of the variable i is checked. If the variable i does not reach N which is the number of images picked up in multiple shooting, the variable i is incremented in step S607, and the process returns back to step S602. The similar process is performed on the next dark image. Thus, the N dark images are generated, each of which is subjected to the correction and the WB process which use the same parameters as those for a corresponding one of the N exposure images picked up in step S304.

In step S608, the image synthesizing unit 205 performs a synthesizing process in which the N dark images are added, and a synthesized dark image data is generated.

FIG. 6B illustrates processes on a series of images according to the present embodiment. Blocks with thick frames indicate image data. In this example, the number of images picked up in multiple shooting is three. Each of exposure images 1 to 3 and dark images 1 to 3 is illustrated as an image which has been subjected to the dark shading correction process. In FIG. 6B, the optical shading correction processes are performed by the optical shading correction unit 202, and the WB correction processes are performed by the WB processing unit 203. The subtraction process is performed by the subtraction processing unit 204.

As described above, according to the present embodiment, dark images are picked up in addition to pickup of exposure images in multiple exposure shooting, and images are generated which correspond to the exposure images and each of which is subjected to image processing equivalent to that for a corresponding one of the exposure images. Synthesized dark image data obtained by synthesizing the generated images is subtracted from synthesized exposure image data obtained by synthesizing the exposure images picked up in the main image pickup operation.

A series of these processes cause fixed pattern noise (such as a vertical streak, a horizontal streak, a defect, and shading) that is degraded by synthesizing images picked up in multiple exposure shooting to be reduced through correction, enabling a high-quality multiple exposure image to be obtained.

The dark image pickup operation requires dark images, the number of which is the same as that of images picked up in multiple shooting. Therefore, when the number N is small, the required time period for the dark image pickup operation is short, and the operability for a photographer is not significantly suppressed. In addition, synthesizing of dark images requires approximately the same arithmetic processing time and the same amount of usage of memory (RAM 109) required for computation as those in the synthesizing process for exposure images.

To prevent overcorrection, the dark correction value may be multiplied by a correction factor k (where k is 1 or less), and the resulting value may be subtracted from the synthesized exposure image. When this process is performed, a configuration may be employed in which the gain processing unit 209 multiplies the dark correction value by the correction factor k after the image synthesizing process performed in step S608.

The time period for accumulation in the dark image pickup operation may be different from that for the exposure images. A shorter time period for accumulation reduces the time period for the dark image pickup operation, improving the operability for a photographer.

In contrast, the time period for accumulation in the dark image pickup operation may be the same as that for the exposure images. In this case, it is possible to correct and reduce noise including noise caused by a dark current in the image pickup device 102.

Description is made in which dark images, the number of which is the same as that of exposure images (N) to be synthesized, are synthesized. However, the number of dark images to be synthesized may be different from that of exposure images to be synthesized. For example, in the case where some of exposure images to be synthesized have been corrected in a way similar to that of an example of the present invention, dark images corresponding to such exposure images are not required to be included in the correction, therefore being skipped in the synthesizing process for dark images.

Second Embodiment

According to the first embodiment, the S/N of a multiple exposure image obtained after correction may be degraded due to an influence of random noise (noise having a noise signal level which is random in terms of time) in each of pixels. Therefore, a second embodiment is characterized by performing a projection computation process on obtained dark images to reduce the influence of random noise and prevent degradation of the S/N.

The second embodiment is different from the first embodiment in terms of the internal block of the DSP 106 and the dark correction value generation process. FIG. 7 is a diagram illustrating a block configuration of the inside of the DSP 106 according to the present embodiment. A projection computation unit 210 averages each of vertical lines of image data in which pixel signals are arrayed in a matrix, and generates a line of projection data.

Figure 8A:
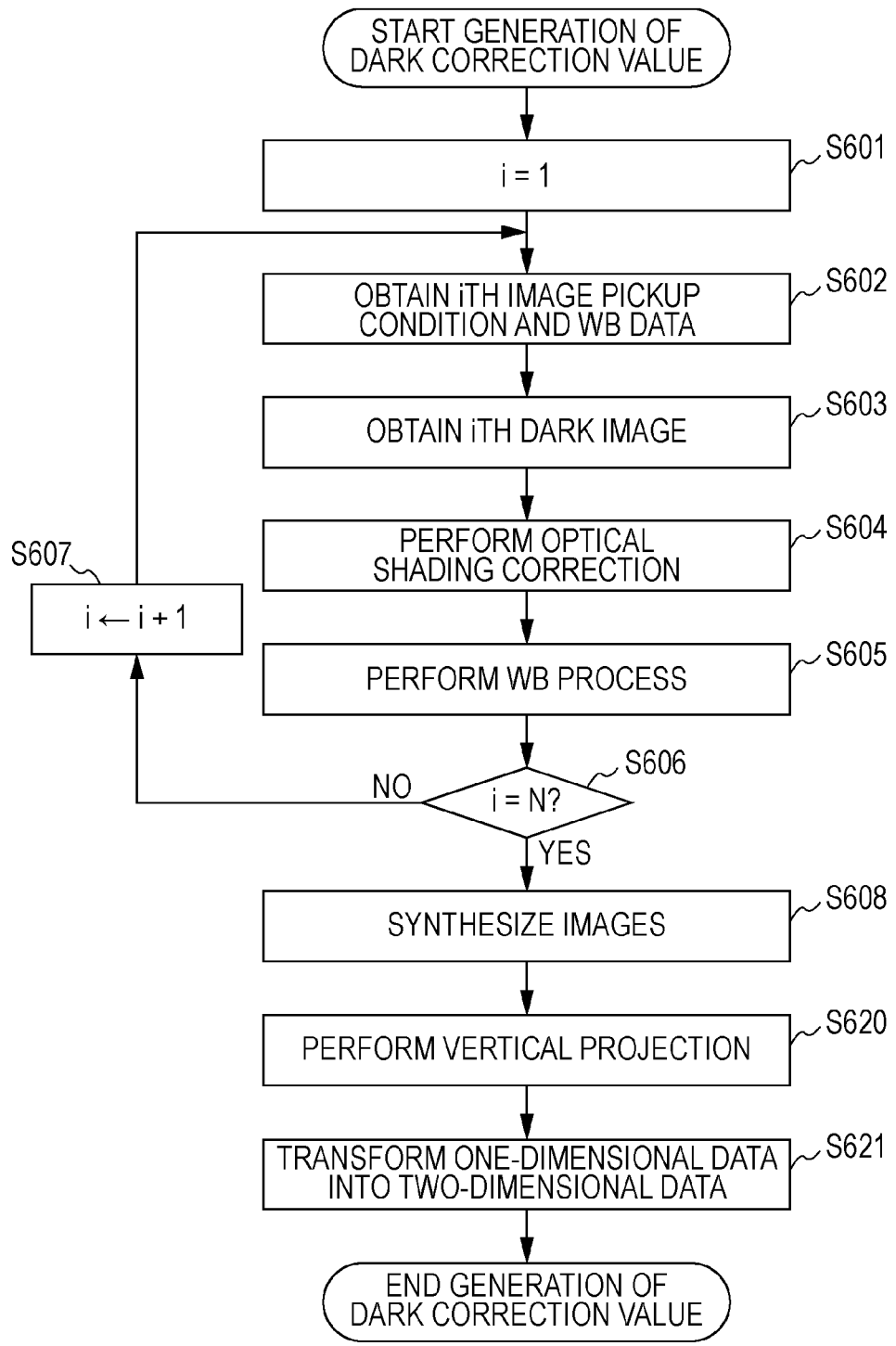
FIG. 8A is a flowchart of image processing according to the second embodiment.
Figure 8B:
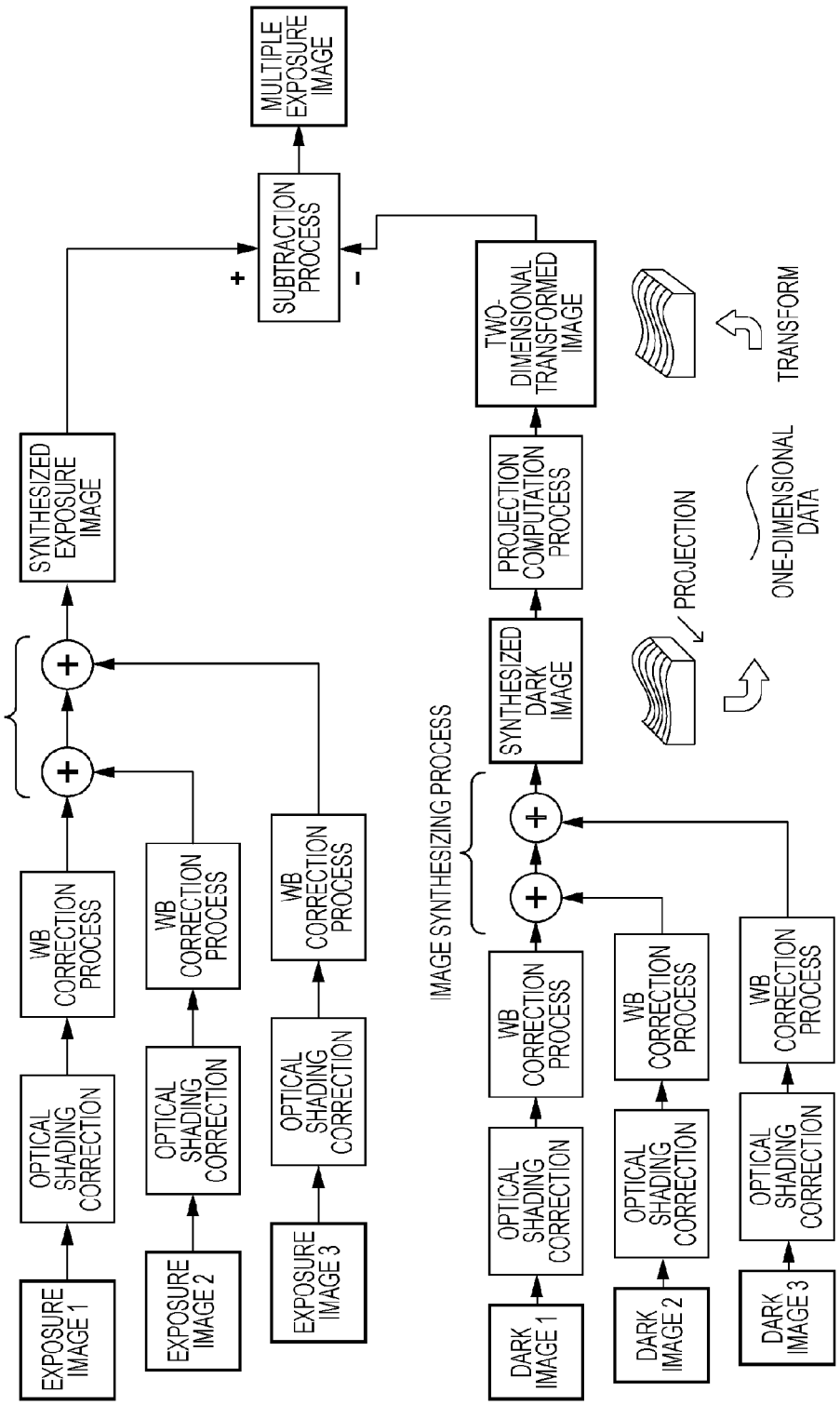
FIG. 8B is a flow diagram of image processing according to the second embodiment.

FIG. 8A is a flowchart illustrating the detail of the generation of a dark correction value performed in step S312 according to the present embodiment. The projection computation unit 210 performs a projection computation process on the synthesized dark image data generated in step S608 to generate one horizontal line of projection data first (in step S620). Then, in step S621, the one-dimensional data is transformed into two-dimensional data by copying the one-dimensional data multiple times, as many as the number of lines of the image, and the generation of a dark correction value ends. FIG. 8B illustrates a series of processes on images according to the present embodiment.

According to the present embodiment, an average value for each line is calculated in the projection computation process in step S620, enabling reduction in the influence of random noise and suppression of the S/N degradation of a multiple exposure image.

As described above, according to the present embodiment, dark images are picked up in addition to the pickup of exposure images in the multiple exposure shooting, and a reference image is generated by projecting an image obtained through addition of the dark images. Thus, degradation of a vertical streak or dark shading in the horizontal direction in multiple exposure shooting can be reduced. Note that unlike the first embodiment, it is impossible to reduce noise components which changes in the vertical direction, such as a defect and a horizontal streak.

Here, in the projection computation process in step S620, vertical projection is performed. Of course, horizontal projection may be performed instead. In this case, noise components to be reduced are a horizontal streak and dark shading in the vertical direction.

According to the present embodiment as well, to prevent overcorrection, the dark correction value may be multiplied by a correction factor k (where k is 1 or less), and the resulting value may be subtracted from the synthesized exposure image. When this process is performed, a configuration may be employed in which the gain processing unit 209 multiplies the dark correction value by the correction factor k after the image synthesizing process performed in step S608.

According to an example of the present invention, the projection computation process in step S620 is applied to the synthesized dark image data obtained through addition and synthesis. However, the application of the projection computation process is not limited to this, and the projection computation process may be performed on pieces of the dark image data after the WB process performed in step S605, or may be performed on pieces of the dark image data before the optical shading correction process performed in step S604. In these cases, in the image synthesizing process in step S608, synthesis is made in such a manner that one-dimensional data (one-dimensional image data) into which the dark image data has been converted is set to each of the lines of one screen to generate dark image data corresponding to one screen. In these methods, computation load is increased because the projection computation process needs to be performed multiple times, as many as the number of picked-up images.

However, particularly when the projection computation process is performed before the optical shading correction process, the projection computation process does not damage vertical components corrected in the optical shading correction process. Therefore, a dark image can be generated which is subjected to image processing equivalent to that for an exposure image.

For example, the time period for accumulation in the dark image pickup operation may be different from that for the exposure images. A shorter time period for accumulation reduces the time period for the dark image pickup operation, improving the operability for a photographer.

In contrast, the time period for accumulation in the dark image pickup operation may be the same as that for the exposure images. In this case, it is possible to correct and reduce noise including noise caused by a dark current in the image pickup device 102.

Description is made in which dark images, the number of which is the same as that of exposure images (N) to be synthesized, are picked up and synthesized. However, the number of dark images is not necessarily the same as that of exposure images. For example, in the case where some of exposure images to be synthesized have been corrected in a way similar to that of an example of the present invention, dark images corresponding to such exposure images are not required to be included in the correction, therefore being skipped in the pickup and synthesizing processes for dark images.

Third Embodiment

According to the first embodiment, the S/N of a multiple exposure image obtained after correction may be degraded due to an influence of random noise (noise having a noise signal level which is random in terms of time) in each of pixels. Therefore, a third embodiment is characterized by obtaining dark images, the number of which is M and is independent of the number of picked-up exposure images (N) in the main image pickup operation, and adding and synthesizing the M dark images to generate a dark reference image, thereby reducing the influence of random noise and preventing degradation of the S/N.

The overall configuration of the image pickup apparatus and the inside of the DSP 106 are similar to those according to the first embodiment illustrated in FIGS. 2 and 3. According to the third embodiment, in the series of camera operations illustrated in FIG. 1, the predetermined number of images in step S310 is set to M which is independent of the number (N) of exposure images obtained in the main image pickup operation.

Figure 9A:
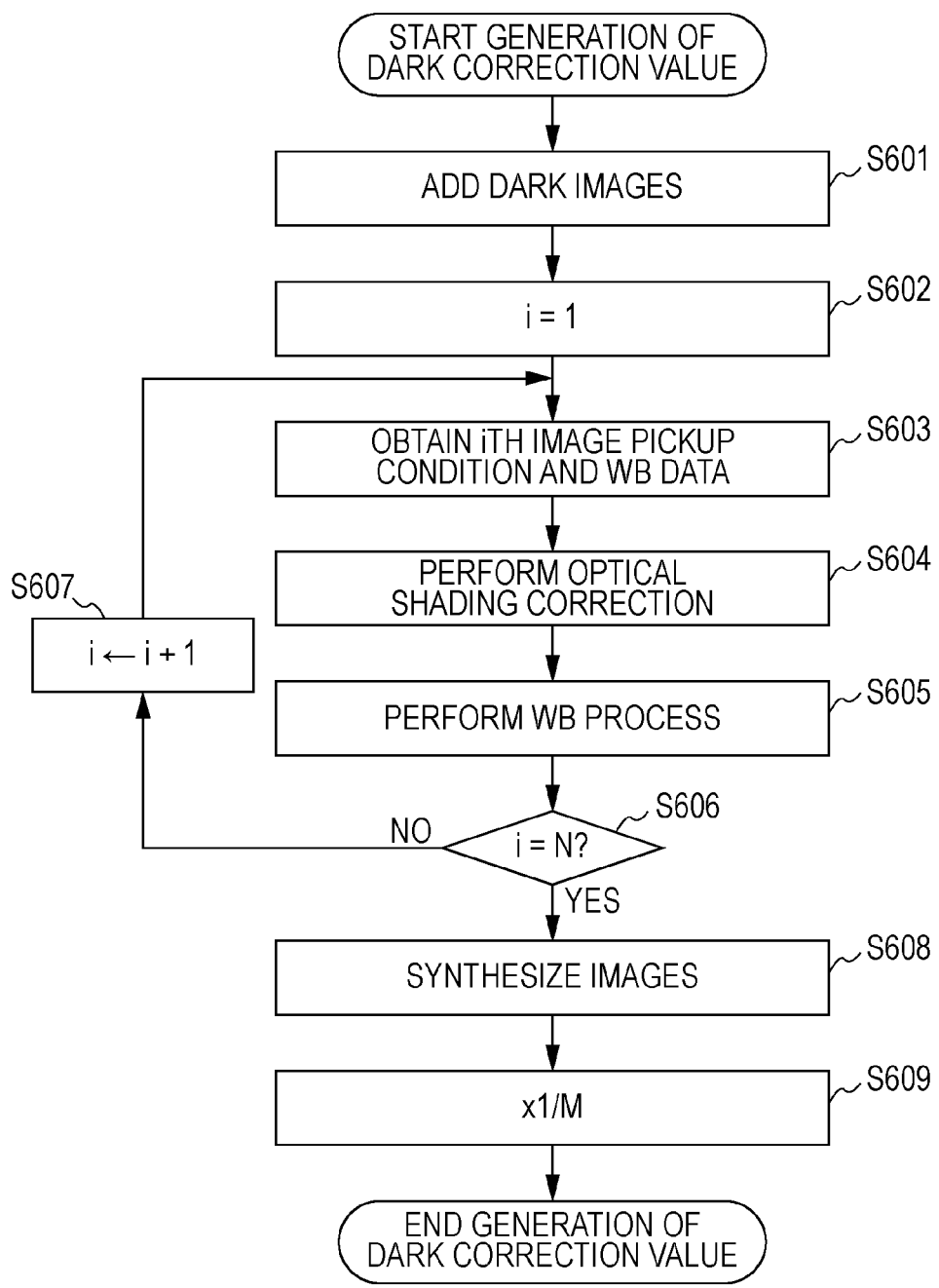
FIG. 9A is a flowchart of image processing according to a third embodiment.

The dark correction value generation process in step S312 is different from that according to the first embodiment. The flowchart is illustrated in FIG. 9A.

In step S601, the image synthesizing unit 205 adds images, the number of which is M and which have been picked up in the dark image pickup operation, to generate a dark reference image. In step S602, the variable i is cleared and set to '1' to count the number of processes performed on the dark reference image generated in step S601.

In step S603, the image pickup conditions and the WB data for the ith image picked up in step S304 are obtained from the RAM 109. These pieces of data are stored into the RAM 109 in step S412. In step S604, an optical shading correction process is performed on the dark reference image. At that time, correction parameters corresponding to the image pickup conditions that are read out in step S603 are used. That is, the same correction parameters as those for the ith picked-up image which are used in step S304 are used. After the optical shading correction process ends, a WB process is performed in step S605. At that time as well, the amount of gain (WB data) obtained in step S603 is used as the amount of gain by which each of the pixels in the Bayer array is multiplied, so that the gain is the same as that for the ith image picked up in step S304. In step S606, the value of the variable i is checked. If the variable i does not reach N which is the number of images in the multiple shooting, the variable i is incremented in step S607, and the process returns back to step S603. Again, the similar processes are repeatedly performed on the dark reference image generated in step S601. Thus, the N dark images are generated, each of which is subjected to the correction and the WB process which use the same parameters as those for a corresponding one of the N exposure images picked up in step S304.

In step S608, the image synthesizing unit 205 adds the N dark images to perform a synthesizing process. In subsequent step S609, the gain processing unit 209 multiplies the image data obtained after the synthesizing process by 1/M, and generates a dark correction value.

Here, the processes in steps S603 to S608 are performed on the dark reference image data obtained by adding the M dark images, and the resulting data is then divided back by M, enhancing the computation accuracy for steps S603 to S608 substantially and enhancing correction accuracy for the multiple exposure image.

Figure 9B:
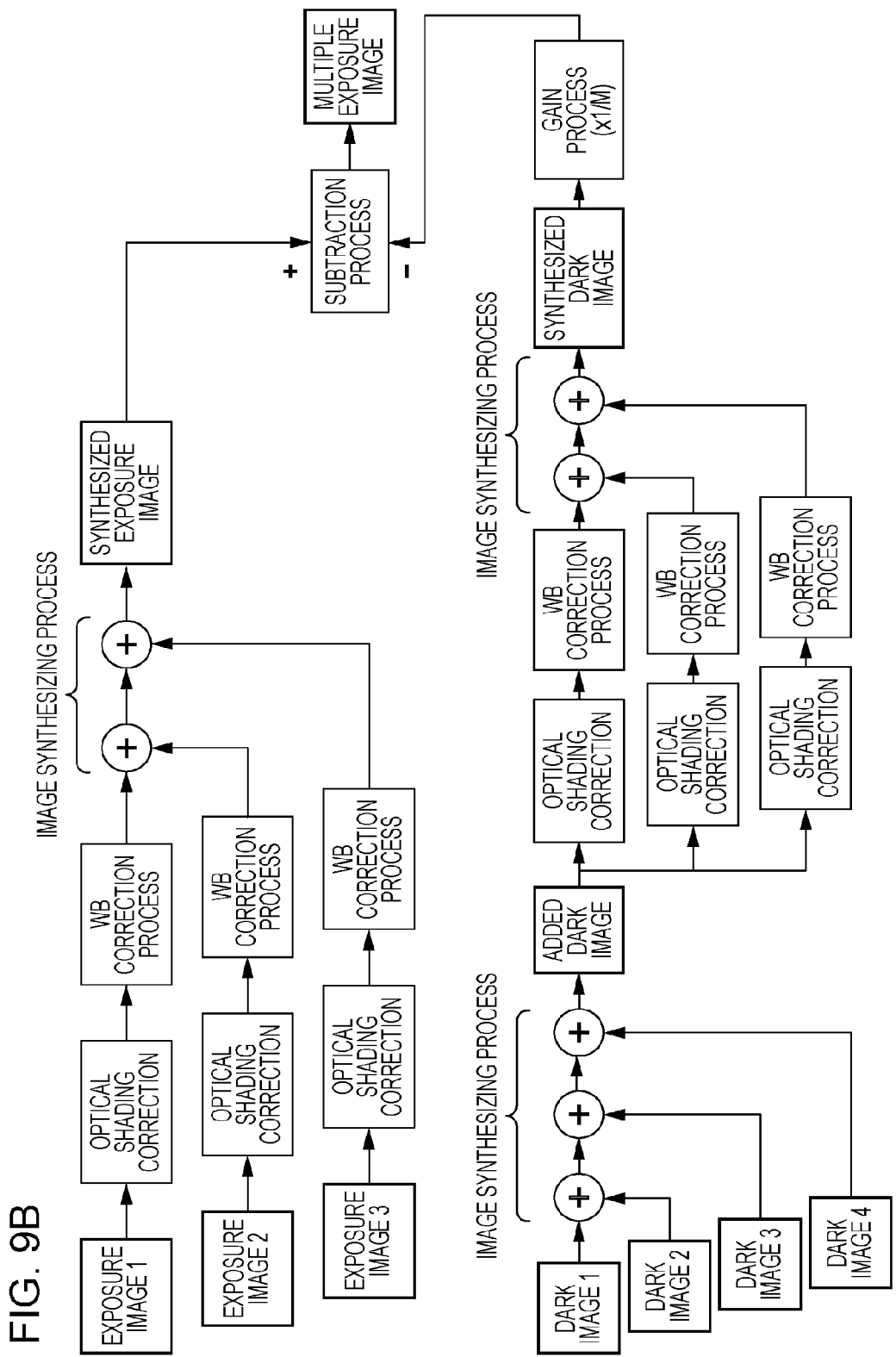
FIG. 9B is a flow diagram of image processing according to the third embodiment.

FIG. 9B illustrates processes on a series of images according to the present embodiment. Blocks with thick frames indicate image data. In this example, the number of images picked up in multiple shooting is three, and the number of dark images is four. Each of exposure images 1 to 3 and dark images 1 to 4 is illustrated as an image which has been subjected to the dark shading correction process. The optical shading correction processes are performed by the optical shading correction unit 202, and the WB correction processes are performed by the WB processing unit 203. The subtraction process is performed by the subtraction processing unit 204.

As described above, according to the present embodiment, dark images are picked up in addition to the pickup of exposure images in the multiple exposure shooting, and a reference image is generated by adding the dark images. On the basis of the generated reference image, images are generated which correspond to the exposure images and each of which is subjected to image processing equivalent to that for a corresponding one of the exposure images. Synthesized dark image data obtained by synthesizing the generated images is subtracted from synthesized exposure image data obtained by synthesizing the exposure images picked up in the main image pickup operation. This causes fixed pattern noise (such as a vertical streak, a horizontal streak, a defect, and shading) that is degraded by synthesizing images picked up in multiple exposure shooting to be reduced through correction, enabling a high-quality multiple exposure image to be obtained.

According to the present embodiment, after the M dark images are added, image correction, such as optical shading correction and a WB process, is performed. Then, the resulting data is divided back by M, enabling the influence of random noise to be reduced and enabling correction data to be computed with high accuracy. The larger the number M of dark images to be picked up is, the larger is the effect of reduction in the influence of random noise, and the higher is the computation accuracy for correction data.

It is desirable that the number 'M' of dark images to be added be larger because a reduction effect of random noise and an effect of improvement in computation accuracy are obtained. However, it is possible to perform the processes with M being set to 1. In the case where M is small, the time period required for the dark image pickup operation is short, reducing the waiting time for a photographer and improving the operability.

The time period for accumulation in the dark image pickup operation may be different from that for the exposure images. A shorter time period for accumulation reduces the time period for the dark image pickup operation, improving the operability for a photographer.

In contrast, the time period for accumulation in the dark image pickup operation may be the same as that for the exposure images. In this case, it is possible to correct and reduce noise including noise caused by a dark current in the image pickup device 102.

Description is made in which dark images, the number of which is the same as that of exposure images (N) to be synthesized, are synthesized. However, the number of dark images to be synthesized may be different from that of exposure images to be synthesized. For example, in the case where some of exposure images to be synthesized have been corrected in a way similar to that of an example of the present invention, dark images corresponding to such exposure images are not required to be included in the correction, therefore being skipped in the synthesizing process for dark images.

Fourth Embodiment

According to the third embodiment, when the number M of dark images to be picked up is small, an influence of random noise in each of pixels is not fully removed. Accordingly, the S/N of a multiple exposure image obtained after the correction may fail to be sufficiently improved. Therefore, the fourth embodiment is characterized by performing a projection computation process on the obtained dark reference image in addition to the processes according to the third embodiment to reduce the influence of random noise and prevent degradation of the S/N.

The overall configuration of the image pickup apparatus is similar to that according to the first embodiment illustrated in FIG. 2, and the inside of the DSP 106 is similar to that according to the second embodiment illustrated in FIG. 7. According to the fourth embodiment as well, in the series of camera operations illustrated in FIG. 1, the predetermined number of images in step S310 is set to M which is independent of the number (N) of exposure images obtained in the main image pickup operation.

The dark correction value generation process in step S312 is different from that according to the first embodiment. The flowchart is illustrated in FIG. 10A.

The projection computation unit 210 performs a projection computation process on an added dark image generated in step S601 to generate one horizontal line of projection data (one-dimensional data) first (in step S620). Then, the processes in step S602 and in its subsequent steps are performed sequentially. When the one-dimensional data is repeatedly input into the optical shading correction unit 202, one-dimensional data that is repeatedly input is multiplied by a corresponding correction gain by which each line of an exposure image has been multiplied and which is determined for the line. The WB processing unit 203 performs a correction process in a similar way. Thus, the processed dark image data is generated which corresponds to one screen. The one-dimensional data that is input next is subjected to a correction process based on a parameter for the first line of the next exposure image, and the resulting data is added to the processed dark image data for the first line of the previous exposure image. This process is repeatedly performed, and a synthesized dark image data is generated by synthesizing pieces of the dark image data which have been subjected to image processing and which correspond to images for multiple shooting. The method according to an example of the present invention is not limited to this. Alternatively, the one-dimensional data may be copied multiple times, as many as the number of lines, to form two-dimensional image data on a memory temporarily, and the optical shading correction process may be then performed.

Figure 10B:
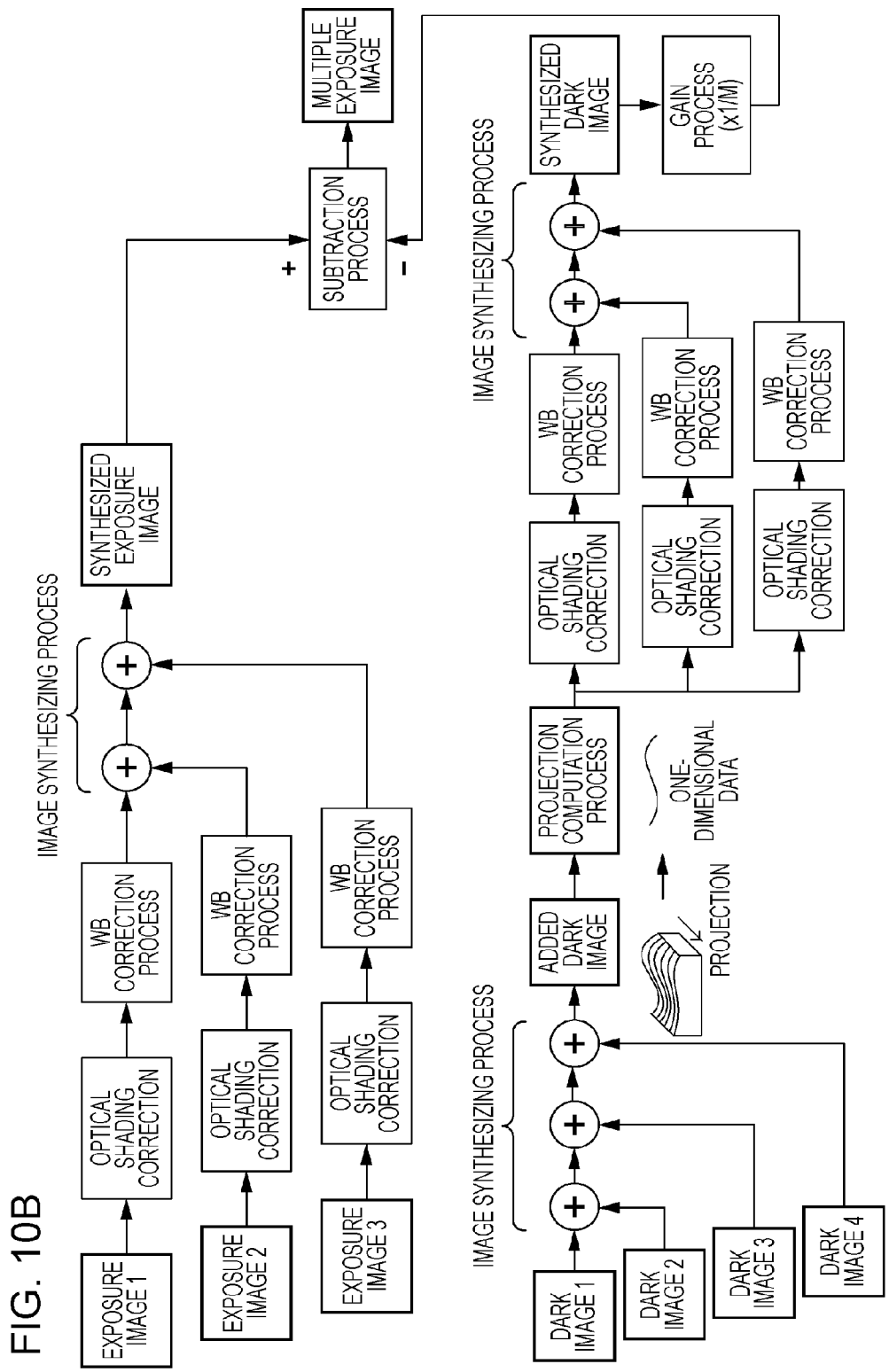
FIG. 10B is a flow diagram of image processing according to the fourth embodiment.

FIG. 10B illustrates a series of processes on images according to the present embodiment.

According to the present embodiment, an average value for each line is calculated in the projection computation process in step S620, enabling reduction in the influence of random noise and suppression of the S/N degradation of a multiple exposure image.

As described above, according to the present embodiment, dark images are picked up in addition to the pickup of exposure images in the multiple exposure shooting, and a reference image is generated by projecting an image obtained through addition of the dark images. On the basis of the generated reference image, images are generated which correspond to the exposure images and each of which is subjected to image processing equivalent to that for a corresponding one of the exposure images. Synthesized dark image data obtained by synthesizing the generated images is subtracted from a synthesized exposure image obtained by synthesizing the exposure images picked up in the main image pickup operation.

Thus, degradation caused by a vertical streak or dark shading in the horizontal direction when a multiple exposure image is picked up can be reduced. Note that unlike the third embodiment, it is impossible to reduce noise components which changes in the vertical direction, such as a defect and a horizontal streak. However, by subjecting the added dark image to the projection computation, even when the number M of dark images to be picked up is small, the influence of random noise can be reduced and S/N degradation of a corrected image can be prevented. In addition, an image obtained by transforming the projection data into two-dimensional data is subjected to an optical shading correction process, whereby even when different corrections are performed depending on the position (coordinates), fixed pattern noise can be corrected with high accuracy.

Here, in the projection computation process in step S620, vertical projection is performed. Of course, horizontal projection may be performed instead. In this case, noise components to be reduced are a horizontal streak and dark shading in the vertical direction.

As described above, preferable embodiments of the present invention are described. The present invention is not limited to these embodiments, and various modifications and changes can be made in the scope of the gist of the invention.

For example, it is desirable that the number 'M' of dark images to be added be larger because a reduction effect of random noise and an effect of improvement in computation accuracy are obtained. However, it is possible to perform the processes with M being set to 1. In the case where M is small, the time period required for the dark image pickup operation is short, reducing the waiting time for a photographer and improving the operability.

Further, the time period for accumulation in the dark image pickup operation may be different from that for the exposure images. A shorter time period for accumulation reduces the time period for the dark image pickup operation, improving the operability for a photographer.

Furthermore, the time period for accumulation in the dark image pickup operation may be different from that for the exposure images. A shorter time period for accumulation reduces the time period for the dark image pickup operation, improving the operability for a photographer.

In contrast, the time period for accumulation in the dark image pickup operation may be the same as that for the exposure images. In this case, it is possible to correct and reduce noise including noise caused by a dark current in the image pickup device 102.

Description is made in which dark images, the number of which is the same as that of exposure images (N) to be synthesized, are synthesized. However, the number of dark images to be synthesized may be different from that of exposure images to be synthesized. For example, in the case where some of exposure images to be synthesized have been corrected in a way similar to that of an example of the present invention, dark images corresponding to such exposure images are not required to be included in the correction, therefore being skipped in the synthesizing process for dark images.

Fifth Embodiment

According to the first embodiment, both of fixed pattern noise in the horizontal direction and that in the vertical direction can be corrected, but an influence of random noise is large. According to the fourth embodiment, although random noise can be corrected by addition and projection computation of the M dark images, both of fixed pattern noise in the horizontal direction and that in the vertical direction cannot be corrected.

Therefore, a fifth embodiment is characterized by selecting a dark correction value generation process using dark images from the above-described two processes in accordance with the shooting setting in the multiple exposure shooting.

The overall configuration of the image pickup apparatus is similar to that according to the first embodiment illustrated in FIG. 2, and the inside of the DSP 106 is similar to that according to the second embodiment illustrated in FIG. 7. That is, a configuration is employed in which both of the dark correction value generation processes in step S312 according to the first and fourth embodiments can be performed.

Examples of specific image pickup conditions used to select a dark correction value generation process include the number of images used in the multiple shooting, the ISO sensitivity, and the temperature of the image pickup device 102. For example, if the number of images used in the multiple shooting is equal to or less than a predetermined number, the dark correction value generation process according to the fourth embodiment (process A) which sufficiently corrects random noise is selected. In contrast, if the number of images used in the multiple shooting is more than the predetermined number, the dark correction value generation process according to the first embodiment (process B) which can correct fixed pattern noise in the horizontal direction and that in the vertical direction is selected. In addition, if the ISO sensitivity is equal to or less than a predetermined value, the process A is selected. From ISO 1600 which is more than the predetermined value, the process B is selected. Alternatively, if the temperature of the image pickup device 102 is equal to or less than a predetermined temperature, the process A is selected. If the temperature is more than the predetermined temperature, the process B is selected. Furthermore, combinations of these can be employed for determination of the process. For example, a table may be created and used to determine whether the process A or B is to be employed, by using a three-dimensional matrix constituted by the number of images picked up in the multiple shooting, the ISO sensitivity, and the temperature of the image pickup device. The temperature of the image pickup device 102 may be estimated by measuring the ambient temperature of the image pickup device by using a thermometer (not illustrated).

A dark correction value generation process is selected when the image pickup conditions are set in step S301. That is, when the number of images picked up in the multiple shooting, the ISO sensitivity, the temperature of the image pickup device 102, and the like, which are described above as the image pickup conditions, are set, the above-described determination is performed in accordance with the image pickup conditions which have been set, and either of the processes A and B is determined. When either of the processes A and B is determined, the predetermined number of dark images to be picked up and the dark correction value generation process are uniquely determined.

As described above, according to the present embodiment, dark images are picked up in addition to the pickup of exposure images in the multiple exposure shooting, and a reference image is generated by projecting an image obtained through addition of the dark images. On the basis of the generated reference image, images are generated which correspond to the exposure images and each of which is subjected to image processing equivalent to that for a corresponding one of the exposure images. Synthesized dark image data obtained by synthesizing the generated images is subtracted from a synthesized exposure image obtained by synthesizing the exposure images picked up in the main image pickup operation. Instead, dark images are picked up in addition to the pickup of exposure images in the multiple exposure shooting. From the dark images, images are generated which correspond to the exposure images and each of which is subjected to image processing equivalent to that for a corresponding one of the exposure images. Synthesized dark image data obtained by synthesizing the generated images is subtracted from a synthesized exposure image obtained by synthesizing the exposure images picked up in the main image pickup operation. The above-described two processes are selectively performed in accordance with the image pickup conditions, enabling noise correction suitable for the image pickup conditions.

As described above, preferable embodiments of the present invention are described. The present invention is not limited to these embodiments, and various modifications and changes can be made in the scope of the gist of the invention.

For example, it is desirable that the number 'M' of dark images to be added be larger because a reduction effect of random noise and an effect of improvement in computation accuracy are obtained. However, it is possible to perform the processes with M being set to 1. In the case where M is small, the time period required for the dark image pickup operation is short, reducing the waiting time for a photographer and improving the operability.

Further, the time period for accumulation in the dark image pickup operation may be different from that for the exposure images. A shorter time period for accumulation reduces the time period for the dark image pickup operation, improving the operability for a photographer.

In contrast, the time period for accumulation in the dark image pickup operation may be the same as that for the exposure images. In this case, it is possible to correct and reduce noise including noise caused by a dark current in the image pickup device 102.

To prevent overcorrection, the dark correction value may be multiplied by a correction factor k (where k is 1 or less), and the resulting value may be subtracted from the synthesized exposure image. When this process is performed, the gain used for multiplication by the gain processing unit 209 may be set to k/M.

Description is made in which dark images, the number of which is the same as that of exposure images (N) to be synthesized, are synthesized. However, the number of dark images to be synthesized may be different from that of exposure images to be synthesized. For example, in the case where some of exposure images to be synthesized have been corrected in a way similar to that of an example of the present invention, dark images corresponding to such exposure images are not required to be included in the correction, therefore being skipped in the synthesizing process for dark images.

According to the present embodiment, the first and fourth embodiments are used as the processes A and B which are switched for a dark correction value generation process. However, the present invention is not limited to this. The dark correction value generation processes disclosed in the first and second embodiments can correct both of fixed pattern noise in the horizontal direction and that in the vertical direction, but an influence of random noise is large. The dark correction value generation processes disclosed in the third and fourth embodiments can correct random noise by adding the M dark images, but cannot correct both of fixed pattern noise in the horizontal direction and that in the vertical direction. That is, the dark correction value generation process disclosed in the first or second embodiment may be used as the above-described process A, and the dark correction value generation process disclosed in the third or fourth embodiment may be used as the process B. In addition, according to the above-described embodiments, the dark image data is obtained through shooting when exposure image data is picked up. However, the method for obtaining dark image data is not limited to this. Factory-installed dark image data which has been stored in a memory in advance may be obtained. This dark image data may be factory-installed images which have been picked up in advance, or may be data which has been calculated from various conditions.

Other Embodiments

An example of the object of the present invention can be achieved as follows. That is, a non-transitory storage medium in which software program codes which describe the procedure for achieving the functions of the above-described embodiments are recorded is supplied to a system or an apparatus. Then, the computer (or CPU, MPU, or the like) of the system or the apparatus reads out the program codes stored in the storage medium and executes them.

In this case, the program codes themselves which are read out from the storage medium achieve the novel functions of an example of the present invention, and the storage medium, which stores the program codes, and the programs are included in an example of the present invention.

Examples of the storage medium for supplying the program codes include a flexible disk, a hard disk, an optical disk, and a magneto-optical disk. In addition, for example, a CD-ROM, a CD-R, a CD-RW, a DVD-ROM, a DVD-RAM, a DVD-RW, a DVD-R, a magnetic tape, a nonvolatile memory card, or a ROM may be used.

The program codes which are read out by the computer are made executable, thereby achieving the functions of the above-described embodiments. In addition, the case is also included in which the OS (operating system) or the like which is operating on the computer executes some or all of the actual processes on the basis of instructions from the program codes, and in which the actual processes achieve the functions of the above-described embodiments.

Further, the following case is also included. First, the program codes which are read out from the storage medium are written in a memory provided for a function expansion board inserted into the computer or a function expansion unit connected to the computer. Then, the CPU or the like provided for the function expansion board or the function expansion unit executes some or all of the actual processes on the basis of instructions from the program codes.

An example of the present invention can provide an image pickup apparatus which can reduce fixed pattern noise (such as a vertical streak, a horizontal streak, a defect, and dark shading) in multiple exposure shooting and which can obtain a high-quality multiple exposure image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2011/073387, filed Oct. 12, 2011, which is hereby incorporated by reference herein in its entirety.

The invention claimed is:

1. An image pickup apparatus comprising:
an image pickup for picking up a subject image and outputting image data;
an image processor for subjecting the image data that is output from the image pickup to image processing, wherein the image processing includes at least one of an optical shading correction process or a white balance correction process;
a synthesizer for synthesizing a plurality of pieces of image data; and
a corrector,
wherein the image pickup apparatus further includes a controller which performs control in such a manner that the image pickup obtains a plurality of pieces of exposure image data by exposing an image pickup device thereof to light to pick up images,
the image processor subjects the plurality of pieces of exposure image data to the image processing,
the synthesizer synthesizes the plurality of pieces of exposure image data that are output from the image processor, to generate synthesized exposure image data,
the image pickup obtains dark image data by shielding the image pickup device from light to pick up an image,
the image processor subjects the dark image data to the image processing using a parameter based on a parameter used in the image processing performed on a corresponding one of the plurality of pieces of exposure image data, and outputs a plurality of pieces of processed dark image data,
the synthesizer synthesizes the plurality of pieces of processed dark image data that are output from the image processor, to generate synthesized dark image data, and
the corrector corrects the synthesized exposure image data on the basis of the synthesized dark image data.

2. The image pickup apparatus according to claim 1, wherein the synthesizer synthesizes a plurality of pieces of image data through addition.

3. The image pickup apparatus according to claim 1, wherein the corrector subtracts the synthesized dark image data from the synthesized exposure image data.

4. The image pickup apparatus according to claim 1, wherein the corrector includes a projection calculator for averaging pieces of image data in the vertical direction or in the horizontal direction to obtain projection data, and wherein the projection calculator converts the synthesized dark image data into one-dimensional data, the one-dimensional data is copied a plurality of times, as many as the number of vertical lines or horizontal lines of one screen, so as to be transformed into image data corresponding to one screen, and the image data corresponding to one screen is subtracted from the synthesized exposure image data.

5. The image pickup apparatus according to claim 1, wherein the image processor determines a parameter by using an image pickup condition including at least one of the type of an image pickup lens, a lens zoom position, an aperture, a shutter speed, a setting of ISO sensitivity, and a temperature, and performs image processing by using the parameter.

6. The image pickup apparatus according to claim 1, wherein the controller is capable of performing a first correction process and a second correction process,
the first correction process being a process in which control is performed in such a manner that
the image pickup obtains a plurality of pieces of dark image data by shielding the image pickup device from light to pick up images,
the image processor subjects each of the plurality of pieces of dark image data to image processing equivalent to image processing performed on a corresponding one of the plurality of pieces of exposure image data,
the synthesizer synthesizes the plurality of pieces of dark image data which are output from the image processor, to generate synthesized dark image data, and
the corrector corrects the synthesized exposure image data on the basis of the synthesized dark image data,
the second correction process being a process in which control is performed in such a manner that
the image pickup obtains a plurality of pieces of dark image data by shielding the image pickup device from light to pick up images,
the synthesizer generates one piece of dark reference image data by using the plurality of pieces of dark image data,
the image processor subjects the one piece of dark reference image data to image processing using a parameter based on a parameter used in image processing performed on a corresponding one of the plurality of pieces of exposure image data and outputs a plurality of pieces of processed dark image data which correspond to the plurality of pieces of exposure image data,
the synthesizer synthesizes the plurality of pieces of processed dark image data which are output from the image processor, to generate synthesized dark image data, and
the corrector corrects the synthesized exposure image data on the basis of the synthesized dark image data, and
wherein the controller selectively performs either one of the first correction process and the second correction process in accordance with an image pickup condition which has been set.

7. The image pickup apparatus according to claim 6, wherein the image pickup condition which has been set includes at least one of the number of pieces of the exposure image data to be picked up, an ISO sensitivity, and the temperature of the image pickup device.

8. A method for controlling an image pickup apparatus, the method comprising:
a first image pickup step of obtaining a plurality of pieces of exposure image data by exposing an image pickup device thereof to light to pick up images;
a first image processing step in which the plurality of pieces of exposure image data are subject to image processing, and a plurality of pieces of processed exposure image data are output;
a first synthesizing step of generating synthesized exposure image data from the plurality of pieces of processed exposure image data that are output from the first image processing step;
a second image pickup step of obtaining dark image data by shielding the image pickup device from light to pick up an image;
a second image processing step in which the dark image data is subject to image processing using a parameter based on a parameter used in the first image processing step performed on a corresponding one of the plurality of pieces of exposure image data, and a plurality of pieces of processed dark image data are output;
a second synthesizing step of generating synthesized dark image data from the plurality of pieces of processed dark image data that are output from the second image processing step; and
a correction step of correcting the synthesized exposure image data on the basis of the synthesized dark image data,
wherein the image processing in the first image processing step and the second image processing step, includes at least one of an optical shading correction process or a white balance correction process.

9. A non-transitory computer readable storage medium that stores a program that causes a computer to execute the steps in the method, according to claim 8, for controlling an image pickup apparatus.

10. An image pickup apparatus comprising:
an image pickup for picking up a subject image and outputting image data;
an image processor for subjecting the image data that is output from the image pickup to image processing, wherein the image processing includes at least one of an optical shading correction process or a white balance correction process;
a synthesizer for synthesizing a plurality of pieces of image data; and
a corrector,
wherein the image pickup apparatus further includes a controller which performs control in such a manner that the image pickup obtains a plurality of pieces of exposure image data by exposing an image pickup device thereof to light to pick up images,
the image processor subjects the plurality of pieces of exposure image data to the image processing,
the synthesizer synthesizes the plurality of pieces of exposure image data that are output from the image processor, to generate synthesized exposure image data,
the image pickup obtains dark image data by shielding the image pickup device from light to pick up an image with a period for accumulation in dark image data pickup operation is shorter than a period for accumulation in exposure image data pickup operation,
the image processor subjects the dark image data to the image processing using a parameter based on a parameter used in the image processing performed on a corresponding one of the plurality of pieces of exposure image data, and outputs a plurality of pieces of processed dark image data, the synthesizer synthesizes the plurality of pieces of processed dark image data that are output from the image processor, to generate synthesized dark image data, and the corrector corrects the synthesized exposure image data on the basis of the synthesized dark image data.

11. The image pickup apparatus according to claim 10, wherein the corrector includes a projection calculator for averaging pieces of image data in the vertical direction or in the horizontal direction to obtain projection data, and wherein the projection calculator converts the synthesized dark image data into one-dimensional data, the one-dimensional data is copied a plurality of times, as many as the number of vertical lines or horizontal lines of one screen, so as to be transformed into image data corresponding to one screen, and the image data corresponding to one screen is subtracted from the synthesized exposure image data.

* * * * *